(12) United States Patent
Furuta et al.

(10) Patent No.: US 6,977,343 B2
(45) Date of Patent: Dec. 20, 2005

(54) HEAT-SENSITIVE MATERIAL AND HEAT-SENSITIVE ELEMENT

(75) Inventors: Kazutaka Furuta, Kanuma (JP); Norikazu Iwasaki, Kanuma (JP)

(73) Assignees: Sony Corporation, Tokyo (JP); Sony Chemicals Corporation, Tokyo (JP)

( * ) Notice: Subject to any disclaimer, the term of this patent is extended or adjusted under 35 U.S.C. 154(b) by 0 days.

(21) Appl. No.: 09/861,319

(22) Filed: May 17, 2001

(65) Prior Publication Data

US 2001/0043138 A1 Nov. 22, 2001

(30) Foreign Application Priority Data

May 18, 2000 (JP) .......................... P. 2000-147061

(51) Int. Cl.[7] .............................................. H02G 3/00
(52) U.S. Cl. ......................... 174/98; 174/33; 174/32; 174/137
(58) Field of Search .............................. 174/33, 32, 98, 174/137 B

(56) References Cited

U.S. PATENT DOCUMENTS

| 4,295,699 A | * | 10/1981 | DuRocher | 439/86 |
| 4,555,422 A | * | 11/1985 | Nakamura et al. | 428/34.9 |
| 4,725,478 A | * | 2/1988 | Mathias et al. | 428/207 |
| 5,039,598 A | * | 8/1991 | Abramsohn et al. | 430/347 |
| 5,162,087 A | * | 11/1992 | Fukuzawa et al. | 252/500 |
| 5,229,641 A | * | 7/1993 | Katayama | 257/678 |
| 6,352,748 B1 | * | 3/2002 | Aylward et al. | 428/14 |
| 6,530,283 B2 | * | 3/2003 | Okada et al. | 73/780 |

FOREIGN PATENT DOCUMENTS

| JP | 1046014 | 2/1989 | |
| JP | 1095863 | 4/1989 | |
| JP | 6335967 | 12/1994 | |
| JP | 7205285 | 8/1995 | |
| JP | 8216252 | 8/1996 | |
| JP | 8245850 | 9/1996 | |
| JP | 8259704 | 10/1996 | |
| JP | 9031285 | 2/1997 | |
| JP | 11-170365 | 6/1999 | |
| JP | 2001165790 A | * | 6/2001 | ............. G01L 5/16 |

* cited by examiner

*Primary Examiner*—Dean A. Reichard
*Assistant Examiner*—Jinhee Lee
(74) *Attorney, Agent, or Firm*—Hogan & Hartson L.L.P.

(57) ABSTRACT

The invention provides a heat-sensitive material having a heat shrinkable material (e.g., a heat shrinkable resin) having dispersed therein electrically conductive particles, which shrinks on heating to allow an electric current to flow. The invention also provides a heat-sensitive element having a heat-sensitive material and a pair of electrode terminals which are useful as an over-charge protective element of lithium ion secondary batteries.

9 Claims, 1 Drawing Sheet

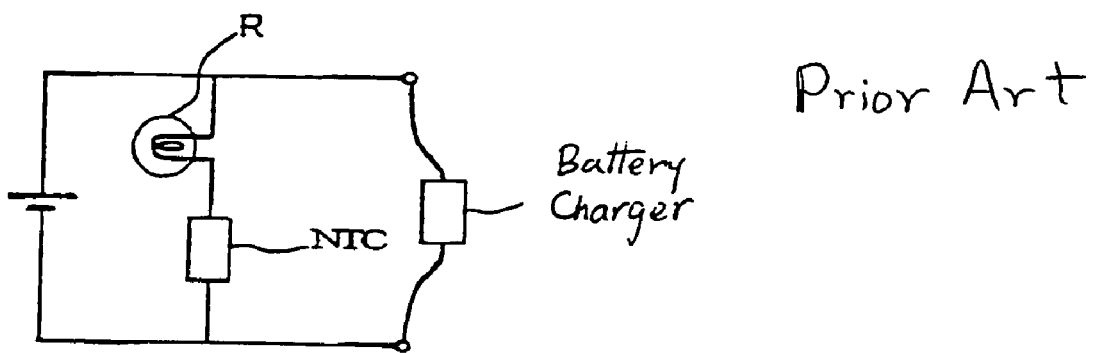
FIG. 1        Prior Art
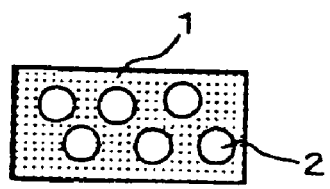
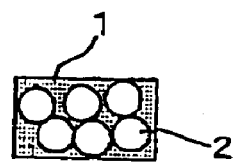
FIG. 2A        FIG. 2B

HEAT-SENSITIVE MATERIAL AND HEAT-SENSITIVE ELEMENT

BACKGROUND OF THE INVENTION

1. Field of the Invention

This invention relates to a heat-sensitive material useful as a NTC (Negative Temperature Coefficient) material, which exhibits a decrease in electrical resistance with increasing temperature.

2. Description of the Related Art

Heat-sensitive elements that can be used as an over-charge (over voltage) protective element for a lithium ion secondary battery include a PTC (positive temperature coefficient) element, a bimetal element, and a thermal fuse.

These over-charge protective elements have the following disadvantages. Since the over-charge protective element is assembled in series to a charging circuit, it consumes power to decrease the capacity of a secondary battery. When an over-charge occurs actually, it takes time for both a lithium ion secondary battery and the over-charge protective element to show a change in appearance.

It is hence conceivable that an NTC element and a resistor R (e.g., a miniature bulb) are connected in parallel to a lithium ion secondary battery as shown in FIG. 1. If an over-charge takes place, the lithium ion secondary battery generates heat, and the NTC element trips and reduces its resistance due to the heat. It follows that a current flows through the NTC element and the resistor R thereby to shut down the charging current to the secondary battery.

The lowest resistivity reached by conventional NTC ceramics (e.g., about 10 Ω) is insufficient to shut down an overcharging current. Further, since the NTC characteristics of NTC ceramics are reversible, the protective element, after once having reduced its resistance, increases its resistance as it cools. It follows that the charging current is again allowed to flow through the lithium ion secondary battery. This means that a battery that should not be used may be used again, which is problematic for safety. For this reason, the conventional NTC ceramics are not fit for use as an over-charge protective element.

SUMMARY OF THE INVENTION

An object of the present invention is to provide a heat-sensitive material which has irreversible NTC characteristics such that it has a very high resistance at an ambient temperature but irreversibly decreases its resistance sufficiently to shut down an overcharging current when heated at or above a prescribed temperature. Especially, the heat-sensitive material can be connected to a secondary battery in parallel and is therefore useful as an over-charge protective element of a lithium ion secondary battery.

The inventors of the present invention have found that a heat shrinkable material 1 having dispersed therein electrically conductive particles (hereinafter "conductive particles") 2 as shown in FIG. 2A irreversibly shrinks on heating to bring the conductive particles 2 into contact with each other as shown in FIG. 2B, thereby greatly reducing its electrical resistance. The present invention has been reached based on this finding.

The present invention provides a heat-sensitive material comprising a heat shrinkable material having dispersed therein electrically conductive particles.

The present invention also provides a heat-sensitive element comprising the heat-sensitive material and a pair of electrode terminals, which is useful as an over-charge protective element for a lithium ion secondary battery.

The present invention also provides a process for producing a heat-sensitive element comprising: inserting an electrode terminal to each opening end of a cylindrically-formed heat-sensitive material; and heating both ends of the heat-sensitive material to shrink them, so as to integrate the electrode terminals to the heat-sensitive material.

BRIEF DESCRIPTION OF THE DRAWING

FIG. 1 is a charging circuitry, in which an NTC element is used as an over-charge protective element for a secondary battery.

FIGS. 2A and 2B illustrate how a heat-sensitive material of the invention works.

DETAILED DESCRIPTION OF THE INVENTION

The heat-sensitive material of the invention is an NTC material and comprises a heat-shrinkable material having dispersed therein electrically conductive particles. On being heated at or above the shrink initiating temperature of the heat shrinkable material, the heat shrinkable material shrinks so as to greatly reduce an electrical resistance of the heat-sensitive material irreversibly.

The heat shrinkable material which can be used in the invention is not particularly limited provided that it is electrically insulating and shrinks on heating at or above a predetermined temperature. Heat shrinkable resins that are easy to mold are preferred. Examples of suitable heat shrinkable resins are silane-copolymerized low-density polyethylene (see JP-A-6-335967), ethylene-(meth) acrylic acid copolymer ionomers (see JP-A-11-170365 and JP-A-8-259704), fluorine-containing copolymers (see JP-A-9-31285, JP-A-8-245850, JP-A-8-216252, and JP-A-7-205285), styrene copolymers (see JP-A-10-95863), and aromatic polyester-polyester elastomer blends (see JP-A-10-46014). According to necessity, these polymers may be subjected to crosslinking treatment by containing a crosslinking agent or by electron irradiation after dispersing the conductive particles.

The conductive particles to be dispersed in the heat shrinkable material can be selected from among known materials, such as carbon black, metal powder, metal silicide powder, metal nitride powder, particles in which a resin-core is covered by metal-plate (metal-plated resin-core particles), and the like.

The particle size of the conductive particles is selected taking into consideration the shrinkage percentage of the heat shrinkable material, the resistance at the lowest, and so forth. The proportion of the conductive particles in the matrix, i.e., the heat shrinkable material is decided also with these factors taken into considerations.

The heat-sensitive material of the invention is not particularly limited in form but is preferably molded into sheet-shape or cylindrical-shape. In using a heat shrinkable resin as a heat shrinkable material, conductive particles are uniformly dispersed in the resin, and the compound is passed through calender rolls, irradiated with electron beams if desired, and stretched at an elevated temperature to a prescribed thickness to obtain a heat-sensitive sheet. A cylindrical heat-sensitive material is prepared by extruding the above-described compound into a cylindrical shape, irradiating the extruded cylindrical material with electron beams if desired, and drawing the cylindrical material at an elevated temperature to a prescribed diameter.

If desired, the heat-sensitive material of the present invention can contain appropriate additives for adjustment of shrinkage percentage or resistance, such as a crosslinking agent, non-conductive particles, and the like.

A combination of the above-described heat-sensitive material and a pair of electrode terminals provides a heat-sensitive element useful as an electronic element.

The size of the electrode terminals to be attached and the manner of attaching the terminals to the heat-sensitive material are not particularly limited and are selected arbitrarily according to the use of the heat-sensitive element.

In a preferred embodiment, each terminal is inserted into each opening end of a cylindrical heat-sensitive material, and the ends of the cylindrical heat-sensitive material are heated to effect heat shrink fit.

The heat-sensitive element of the invention is useful as an NTC element as in FIG. 1, i.e., an over-charge protective element for a lithium ion secondary battery. It is also applicable to a thermal switch of an air cooling fan or a fire sensor.

The present invention will now be illustrated in greater detail with reference to Examples, but it should be understood that the invention is not limited thereto.

EXAMPLE 1

A hundred fifty parts by weight of carbon particles (PC-1020, available from Nippon Carbon Co., Ltd.) were uniformly mixed into 100 parts by weight of silane-copolymerized low-density polyethylene (Linkron XF800T, available from Mitsubishi Chemical Corp.) in a kneader. The compound was extruded into a cylindrical shape by using an extruder (KEX-25, supplied by Kurimoto, Ltd.). The extruded cylindrical material was crosslinked by irradiation with 5 Mrad of electron radiation and then drawn in a 150° C. environment to obtain a cylindrical heat-sensitive material having a prescribed diameter.

An electrode terminal was inserted to each end of the cylindrical heat-sensitive material and fixed there by heat shrink fit. The resulting heat-sensitive element had a resistance of 100 k$\Omega$ at an ambient temperature, but, when immersed in water at 100° C. for 30 seconds, it reduced its resistance to 0.5 $\Omega$.

As shown in FIG. 1, the resulting heat-sensitive element was assembled into a charging circuit for lithium ion secondary batteries as an NTC element in contact with a secondary battery to be charged. When an over-charge took place, the flow of current to the secondary battery was cut off. Even after the temperature of the secondary battery dropped, the flow of current was not restored. This means that the heat-sensitive element irreversibly had cut off the over-charging current.

The heat-sensitive material of the invention has a high resistance at an ambient temperature but irreversibly decreases its resistance sufficiently to shut down an overcharging current when heated at or above a prescribed temperature. Especially, the heat-sensitive material can be connected to a secondary battery in parallel and is therefore useful as an over-charge protective element of a lithium ion secondary battery.

While the invention has been described in detail and with reference to specific examples thereof, it will be apparent to one skilled in the art that various changes and modifications can be made therein without departing from the spirit and scope thereof.

The entire disclosure of each and every foreign patent application from which the benefit of foreign priority has been claimed in the present application is incorporated herein by reference, as if fully set forth herein.

What is claimed is:

1. A heat-sensitive material comprising a heat shrinkable material and a pair of electrode terminals, the heat shrinkable material having dispersed therein electrically conductive particles, the heat-sensitive material being cross-linked, wherein the heat shrinkable material is a heat shrinkable resin, and wherein the heat shrinkable material irreversibly shrinks upon the application of heat, reducing the resistance of the heat shrinkable material and allowing the heat sensitive material to act as an over-voltage protective element.

2. The heat-sensitive material according to claim 1, which has a sheet shape or a cylindrical shape.

3. A heat-sensitive element comprising a heat-sensitive material and a pair of electrode terminals, the heat sensitive material including a heat shrinkable material having dispersed therein electrically conductive particles, wherein the heat shrinkable material shrinks upon heating caused by the application of heat to bring the electrically conductive particles into contact with each other and to irreversibly reduce an electrical resistance of the heat-sensitive element and allowing the heat sensitive material to act as an over-voltage protective element, and wherein the electrically conductive particles are metal-plated, resin-core particles.

4. The heat-sensitive material according to claim 3, wherein the heat shrinkable material is a heat shrinkable resin.

5. The heat-sensitive material according to claim 4, which has a sheet shape or a cylindrical shape.

6. The heat-sensitive material according to claim 3, which is an over-charge protective element for a lithium ion secondary battery.

7. The heat-sensitive material according to claim 3, which is connected to a secondary battery in parallel.

8. The heat-sensitive material according to claim 3, which has a sheet shape or a cylindrical shape.

9. An over-charge protective system, comprising:
a secondary battery;
a battery charger; and
a heat sensitive material comprising a heat shrinkable material and a pair of electrodes, the heat shrinkable material having dispersed therein electrically conductive particles, the heat-sensitive material being cross-linked, wherein the heat shrinkable material includes a heat shrinkable resin, and wherein the heat shrinkable material irreversibly shrinks upon the application of heat, reducing the resistance of the heat shrinkable material and allowing the heat sensitive material to act as an over-voltage protective element.

* * * * *